United States Patent
Hashimoto

(10) Patent No.: US 10,509,879 B2
(45) Date of Patent: Dec. 17, 2019

(54) OPTIMUM STAGE NUMBER CALCULATION METHOD, INFORMATION PROCESSING APPARATUS, AND RECORDING MEDIUM

(71) Applicant: FUJITSU LIMITED, Kawasaki-shi, Kanagawa (JP)

(72) Inventor: Michitaka Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/992,334

(22) Filed: May 30, 2018

(65) Prior Publication Data
US 2018/0349534 A1  Dec. 6, 2018

(30) Foreign Application Priority Data
Jun. 1, 2017 (JP) .................. 2017-109513

(51) Int. Cl.
G06F 17/50  (2006.01)

(52) U.S. Cl.
CPC ...... *G06F 17/5031* (2013.01); *G06F 17/5027* (2013.01); *G06F 17/5054* (2013.01); *G06F 17/5059* (2013.01); *G06F 17/5072* (2013.01)

(58) Field of Classification Search
CPC ............. G06F 17/5031; G06F 17/5027; G06F 17/5054
USPC ........................................................ 716/113
See application file for complete search history.

(56) References Cited

U.S. PATENT DOCUMENTS

| | | | |
|---|---|---|---|
| 2001/0007145 A1 | 7/2001 | Sakagami et al. | |
| 2008/0168411 A1* | 7/2008 | Mang .................. | G06F 17/5031 716/114 |
| 2009/0150847 A1* | 6/2009 | Morgenshtein ..... | G06F 17/5068 716/119 |
| 2017/0230253 A1* | 8/2017 | Chopra ................. | H04L 41/145 |

FOREIGN PATENT DOCUMENTS

| | | |
|---|---|---|
| JP | 2001-160078 | 6/2001 |
| JP | 2008-123056 | 5/2008 |

\* cited by examiner

*Primary Examiner* — Suchin Parihar
(74) *Attorney, Agent, or Firm* — Fujitsu Patent Center

(57) ABSTRACT

An optimum stage number calculation method executed by a processor, the optimum stage number calculation method includes extracting information on a signal path between a transmission cell and a reception cell that transmits and receives a signal according to a clock from net information indicating a connection relationship between a plurality of cells arranged and wired in a field programmable gate array, estimating a cell total delay amount indicating a total delay amount of cells allowed to be included in one period of the clock in the signal path from input information including at least clock period information indicating a length of one period of the clock, calculating the number of stages of logic cells included in the signal path from the cell total delay amount, and outputting number-of-stages information indicating the calculated number of stages of the logic cells.

9 Claims, 11 Drawing Sheets

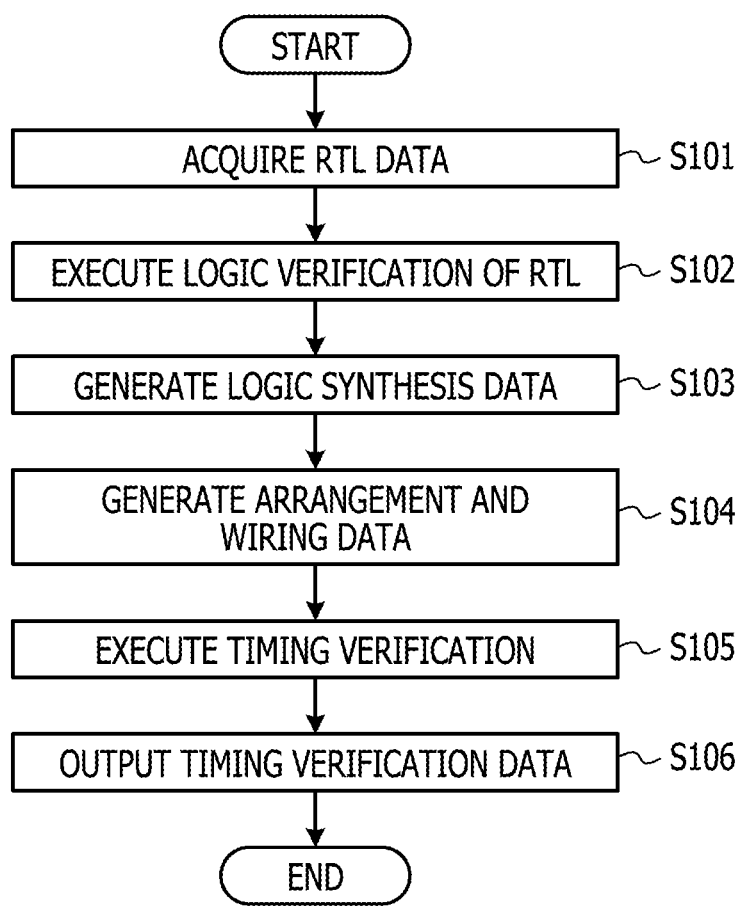

FIG. 5

| DEVICE | CELL | CELL DELAY AMOUNT [ps] |
|---|---|---|
| A | FF | 100 TO 150 |
|  | LUT | 80 TO 150 |
|  | RAM | 200 TO 250 |
|  | DSP | 200 TO 300 |
| A | FF | 100 TO 180 |
|  | LUT | 100 TO 150 |
|  | RAM | 220 TO 290 |
|  | DSP | 220 TO 350 |

113

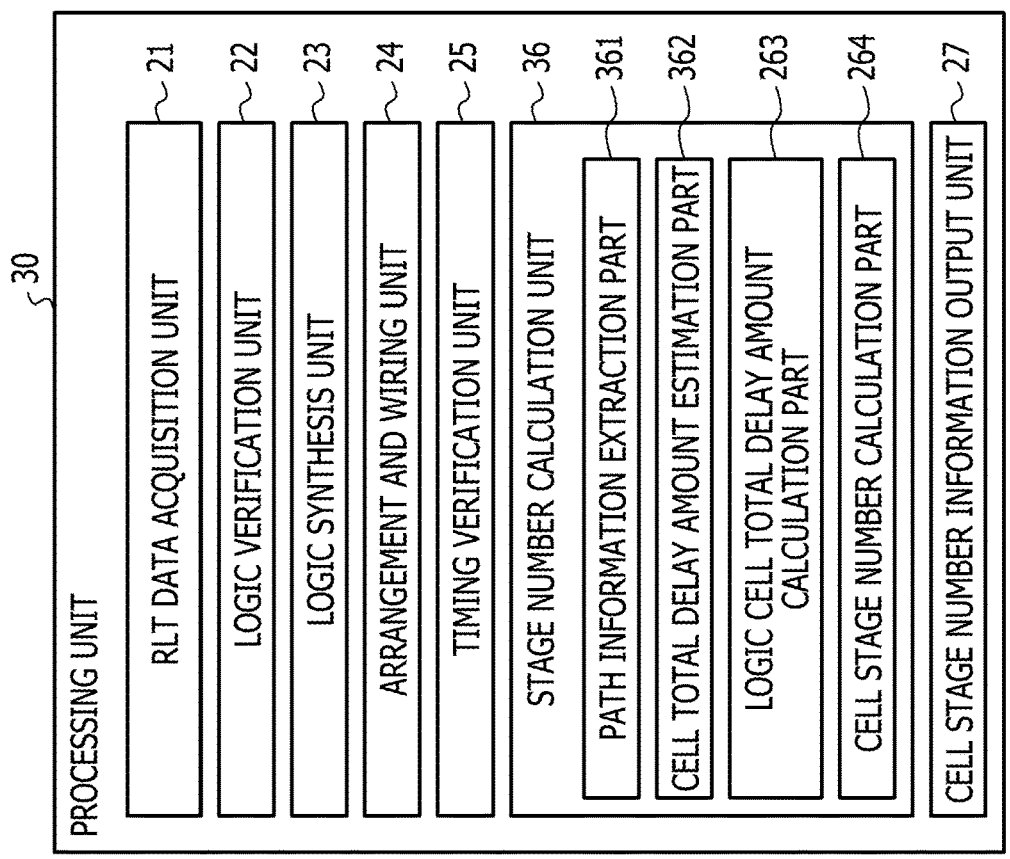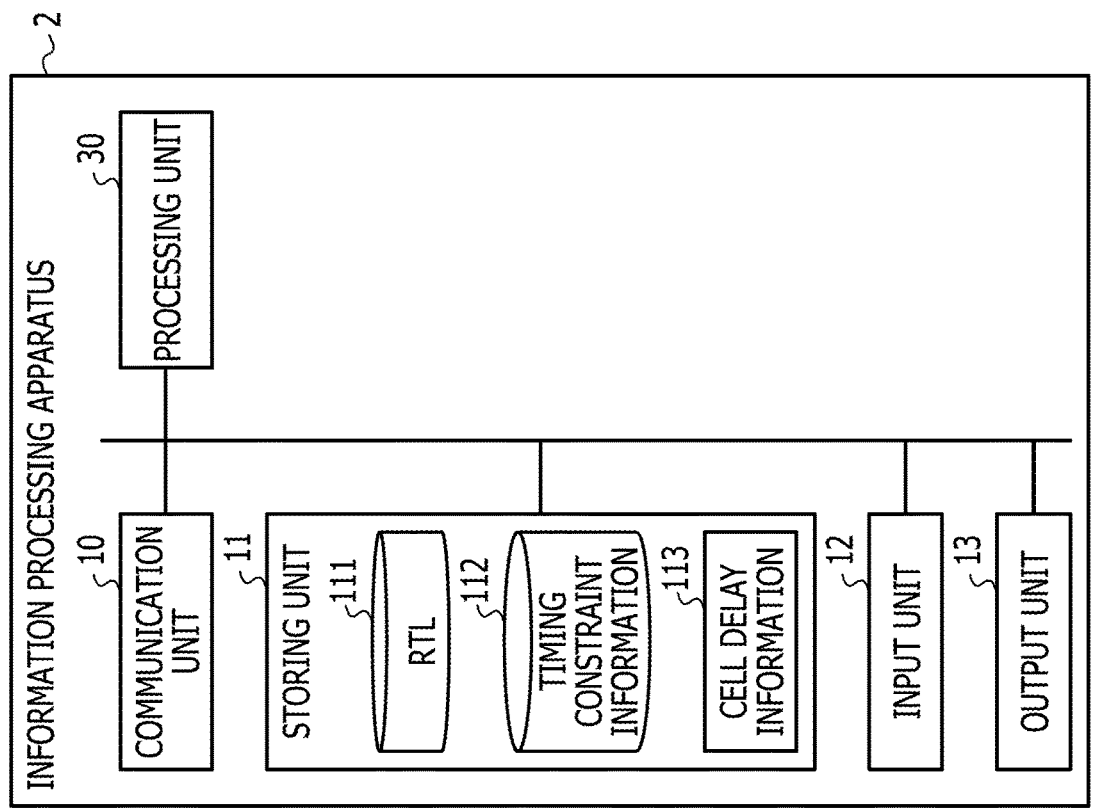

OPTIMUM STAGE NUMBER CALCULATION METHOD, INFORMATION PROCESSING APPARATUS, AND RECORDING MEDIUM

CROSS-REFERENCE TO RELATED APPLICATION

This application is based upon and claims the benefit of priority of the prior Japanese Patent Application No. 2017-109513, filed on Jun. 1, 2017, the entire contents of which are incorporated herein by reference.

FIELD

The embodiments discussed herein are related to an optimum stage number calculation method, an information processing apparatus, a recording medium storing therein an optimum stage number calculation program.

BACKGROUND

In designing a field programmable gate array (FPGA) or the like, a technique for verifying whether or not a timing error such as a critical path occurs is known.

In recent years, an FPGA installed with a plurality of functional blocks that operate at different frequencies and different voltages is being commercialized accompanying advancement of miniaturization and high functionality of the FPGA. Various FPGAs having different delay characteristics are provided according to a maker supplying the FPGA and a grade of a supplied FPGA.

A logic described with a register transfer level (RTL) by a circuit designer who designs a circuit to be installed on the FPGA is subjected to logic verification. The logic subjected to logic verification is subjected to logical synthesis so as to satisfy predetermined timing constraint to generate net information, and generated net information is subjected to arrangement and wiring, and arrangement and wiring data indicating arrangement and wiring information of a cell is generated. The generated arrangement and wiring data is subjected to timing verification and timing verification information indicating a signal path where a timing error such as a setup error and a hold error has occurred is output. In order to resolve the timing error of the signal path in which the timing error indicated by timing verification information has occurred, for each signal path in which the timing error has occurred, the circuit designer corrects the RTL in a case where it is impossible to resolve the timing error by changing arrangement and wiring data.

The circuit designer inserts flip-flops into the signal path where the timing error has occurred based on past experience and corrects the RTL so that the timing error is resolved. Since RTL correction is executed based on the past experience of the circuit designer, there is a concern that the timing error may not be resolved by correcting the RTL when the designer has little experience or the like. When the timing error is not resolved by RTL correction, there is a concern that a process from RTL correction to timing verification is repeated and design costs increase.

There is a concern that, in order to reliably resolve the timing error, the circuit designer may insert the flip-flops excessively in the signal path where the timing error has occurred. When the flip-flops are excessively inserted into the signal path where the timing error has occurred, the number of flip-flops having a relatively high operating frequency increases and the circuit scale of the FPGA increases more than demanded, and thus, power consumption of the FPGA increases.

The following is a reference document.

[Document 1] Japanese Laid-open Patent Publication No. 2008-123056.

SUMMARY

According to an aspect of the invention, an optimum stage number calculation method executed by a processor, the optimum stage number calculation method includes extracting information on a signal path between a transmission cell and a reception cell that transmits and receives a signal according to a clock from net information indicating a connection relationship between a plurality of cells arranged and wired in a field programmable gate array, estimating a cell total delay amount indicating a total delay amount of cells allowed to be included in one period of the clock in the signal path from input information including at least clock period information indicating a length of one period of the clock, calculating the number of stages of logic cells included in the signal path from the cell total delay amount, and outputting number-of-stages information indicating the calculated number of stages of the logic cells.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an FPGA design process by an information processing apparatus (not illustrated);

FIG. 5 is a diagram illustrating an example of cell delay information illustrated in FIG. 4A;

FIG. 8A is a circuit block diagram of an information processing apparatus that executes an installation position determination process according to a second embodiment;

FIG. 8B is a functional block diagram of a processing unit illustrated in FIG. 8A;

DESCRIPTION OF EMBODIMENTS

In the following, an information processing apparatus, an installation position determination program, and an installation position determination method according to the embodiments will be described with reference to the drawings. However, the technical scope of the disclosure is not limited to these embodiments.

General Optimum Stage Number Calculation Method

Prior to describing the optimum stage number calculation method according to the embodiment, a general optimum stage number calculation method will be described.

Figure 1B:
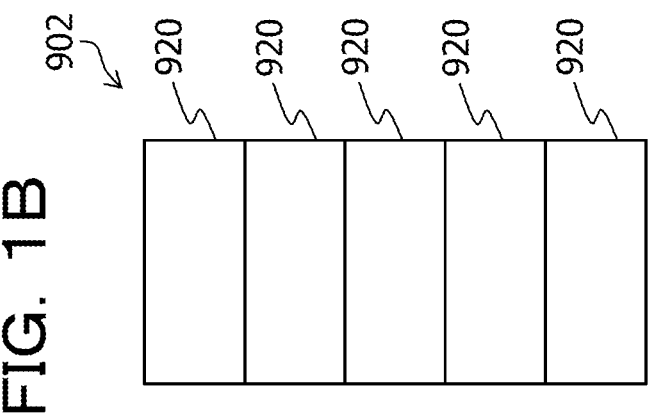
FIG. 1B is an internal block diagram of a CLB illustrated in FIG. 1A.
Figure 1A:
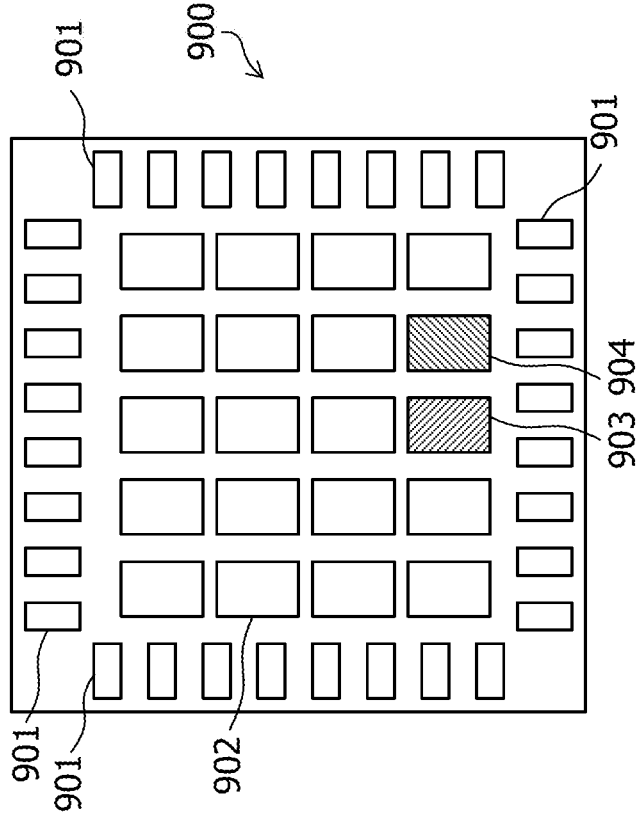
FIG. 1A is a schematic plan view of an FPGA.
Figure 1C:
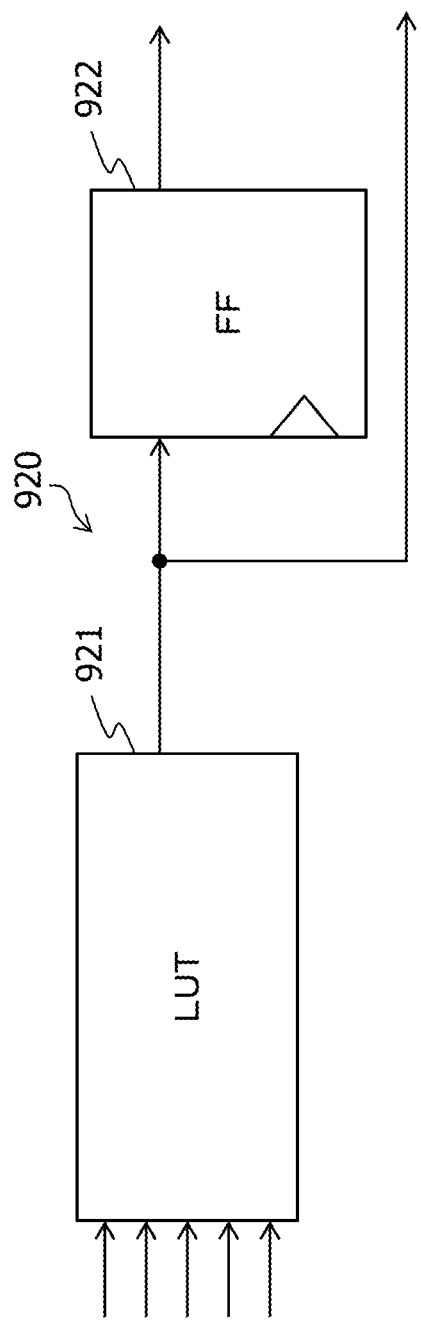
FIG. 1C is an internal block diagram of a logic element (LE) illustrated in FIG. 1B.

FIG. 1A is a schematic plan view of an FPGA, FIG. 1B is an internal block diagram of a CLB illustrated in FIG. 1A, and FIG. 1C is an internal block diagram of an LE illustrated in FIG. 1B.

An FPGA 900 includes a plurality of IO blocks 901 arranged along the outer periphery, a plurality of CLBs 902 arranged in an array form in an inner area surrounded by the plurality of IO blocks 901, and IP blocks such as a block RAM 903 and a DSP 904. In FIG. 1A, the block RAM 903 is hatched with oblique lines downward to the right, and the DSP 904 is hatched with oblique lines downward to the left. A wiring region having wirings and switches connectable with respective blocks is formed between each IO block 901, each CLB 902, the block RAM 903, and the DSP 904.

The CLB 902 includes a plurality of LEs 920. Each of the plurality of LEs 920 includes a look-up table (LUT) 921 and a flip-flop 922. The LUT 921 is also referred to as a logic cell, is a multi-input, 1-output table, and is formed by a memory of a scale corresponding to the number of inputs. For example, in the case where the LUT 921 is a 5 input, 1-output table, the LUT 921 is formed by a 32-bit memory. The LUT 921 realizes a desired combinational circuit according to settings input from the outside during an arrangement and wiring process. The flip-flop 922 latches a signal output from the LUT 921 according to a clock input via the wiring region, and outputs the latched signal to another CLB 902 via the wiring region.

FIG. 2 is a diagram illustrating an FPGA design process by an information processing apparatus (not illustrated). The information processing apparatus (not illustrated) is, for example, an electronic computer such as a personal computer. The FPGA design process illustrated in FIG. 2 is executed in cooperation with each component of the information processing apparatus mainly by an operation unit such as a central processing unit (CPU), based on a computer program stored in a memory of the information processing apparatus in advance.

First, the information processing apparatus acquires RTL data indicating an RTL designed by the designer (S101) and executes logic verification of the RTL corresponding to the acquired RTL data (S102). Next, the information processing apparatus executes logic synthesis based on the RTL data, on which the logic verification is executed, and timing constraint information, and generates logic synthesis data also called a net list (S103). Timing constraint information indicates timing constraints, such as a clock frequency, of the FPGA to be used. Next, the information processing apparatus executes a process of arranging and wiring a circuit corresponding to the generated logic synthesis data on the FPGA and generates arrangement and wiring data (S104). Next, the information processing apparatus executes timing verification of arrangement and wiring data information corresponding to the arrangement and wiring data (S105), and outputs timing verification data indicating a timing verification result (S106). By referencing the timing verification result, the designer rewrites the RTL so as to add a flip-flop to each of the signal paths in which the timing error occurs, thereby resolving the timing error of the signal path where the timing error occurs.

However, since a process of inserting the flip-flop into the signal path where the timing error occurs in order to resolve the timing error is manually executed by the designer, there is a concern that the process may depend on the experience of the designer who executes work. For example, when the process is executed by an inexperienced designer, there is a concern that the timing error may not be resolved due to an inappropriate number or positions of flip-flops to be inserted. Also, when the process is executed by the inexperienced designer, there is a concern that the number of flip-flops to be inserted becomes too large and thus, a circuit scale may increase more than demanded and power consumption of the FPGA may increase.

Figure 3A:
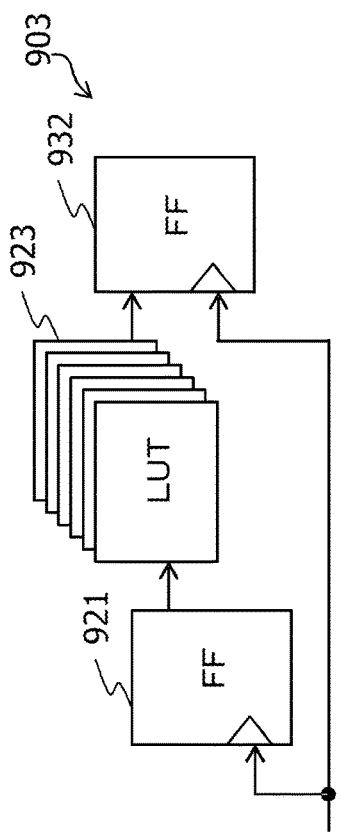
FIG. 3A is a diagram illustrating an example of a signal path in which a timing error has occurred.
Figure 3B:
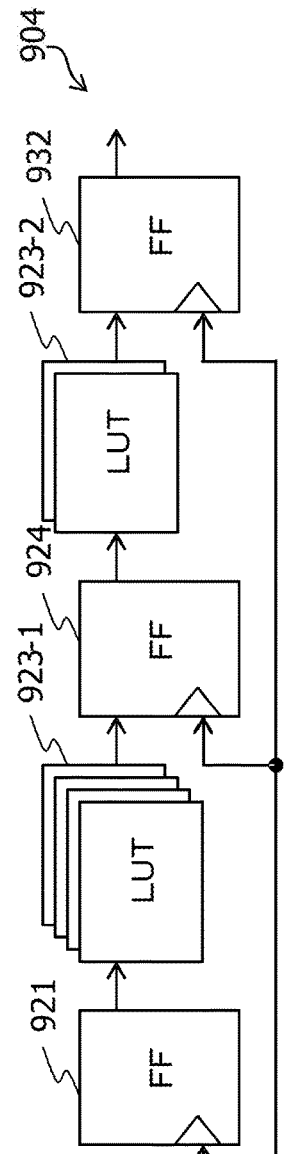
FIG. 3B is a diagram illustrating an example in which a flip-flop is inserted in the signal path illustrated in FIG. 3A.
Figure 3C:
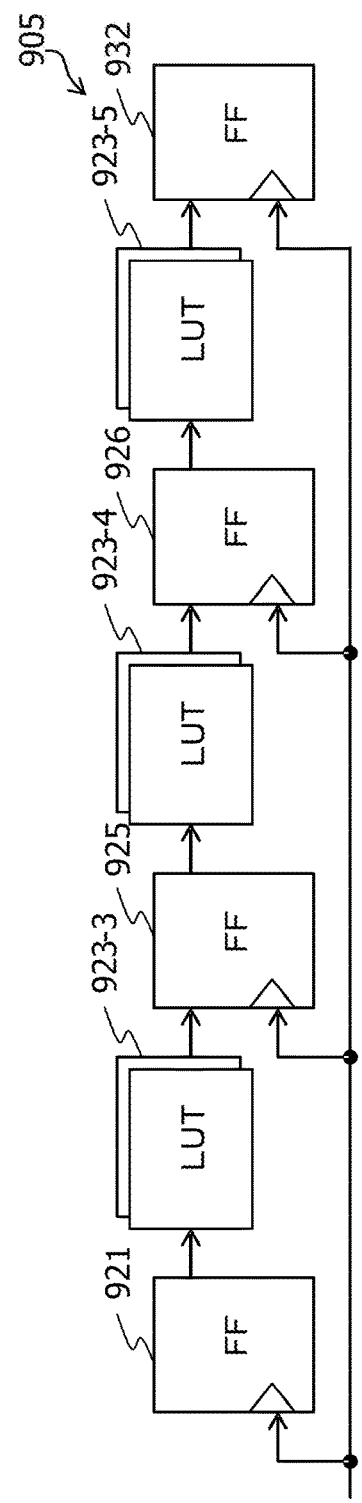
FIG. 3C is a diagram illustrating another example in which flip-flops are inserted in the signal path illustrated in FIG. 3A.

FIG. 3A is a diagram illustrating an example of a signal path in which a timing error occurs. FIG. 3B is a diagram illustrating an example in which a flip-flop is inserted in the signal path illustrated in FIG. 3A, and FIG. 3C is a diagram illustrating another example in which flip-flops are inserted in the signal path illustrated in FIG. 3A. In the examples illustrated in FIGS. 3A and 3B, in characteristics of the FPGA in the signal path, it is assumed that the number of stages of LUTs capable of being arranged in the signal path between the flip-flops, which are transmission cell and the reception cell, is three.

In a signal path 903 illustrated in FIG. 3A, a six-stage LUT 923 is arranged between the flip-flop 921 which is a transmission cell and a flip-flop 932 which is a reception cell. Since the number of stages of the LUT 923 that may be arranged in the signal path between the flip-flops 921 and 932 is three, a timing error occurs in the signal path 903.

In a signal path 904 illustrated in FIG. 3B, a flip-flop 924 is inserted between the flip-flop 921 which is a transmission cell and a flip-flop 932 which is a reception cell. By inserting the flip-flop 924 between the flip-flop 921 which is the transmission cell and the flip-flop 932 which is the reception cell, the six-stage LUT 923 is divided into a four-stage LUT 923-1 and a two-stage 923-2. In the signal path 904, the number of stages of the LUT 923-1 is four, which is larger than three, that is, the number of stages of LUTs capable of being arranged in the signal path between the flip-flops, and the timing error is not resolved.

On the other hand, in a signal path 905 illustrated in FIG. 3C, flip-flops 925 and 926 are inserted between the flip-flop 921 which is a transmission cell and a flip-flop 932 which is a reception cell. By inserting the flip-flops 925 and 926 between the flip-flop 921 which is the transmission cell and the flip-flop 932 which is the reception cell, the six-stage LUT 923 is divided into LUTs 923-3, 923-4, and 923-5 each of which is a two-stage LUT.

In the signal path 905, since two-stage LUTs are arranged between the flip-flops, the timing error is resolved, but the number of flip-flops to be inserted becomes excessive. That is, since the number of stages of the LUTs capable of being arranged in the signal path between the flip-flops is three, although the timing error is resolved by adding only one flip-flop, two flip-flops are added in the signal path 905. In the signal path 905, as the number of flip-flops to be inserted becomes excessive, the number of flip-flops having relatively high operating frequencies increases, the FPGA circuit scale increases more than demanded, and power consumption of the FPGA increases.

Overview of Information Processing Apparatus According to Embodiment

The information processing apparatus according to the embodiment estimates a cell total delay amount indicating a total delay amount of the cells allowed to be included in one period of a clock from input information including at least clock period information indicating a length of one period of the clock in a signal path. Then, the information processing apparatus according to the embodiment determines the number of stages of logic cells included in the signal path from the cell total delay amount. The information processing apparatus according to the embodiment may calculate the number of stages of logic cells included in the signal path from the cell total delay amount estimated from the input information including at least clock period information indicating the length of one period of the clock, and calculate an optimum number of stages regardless of the experience of the designer.

Figure 4B:
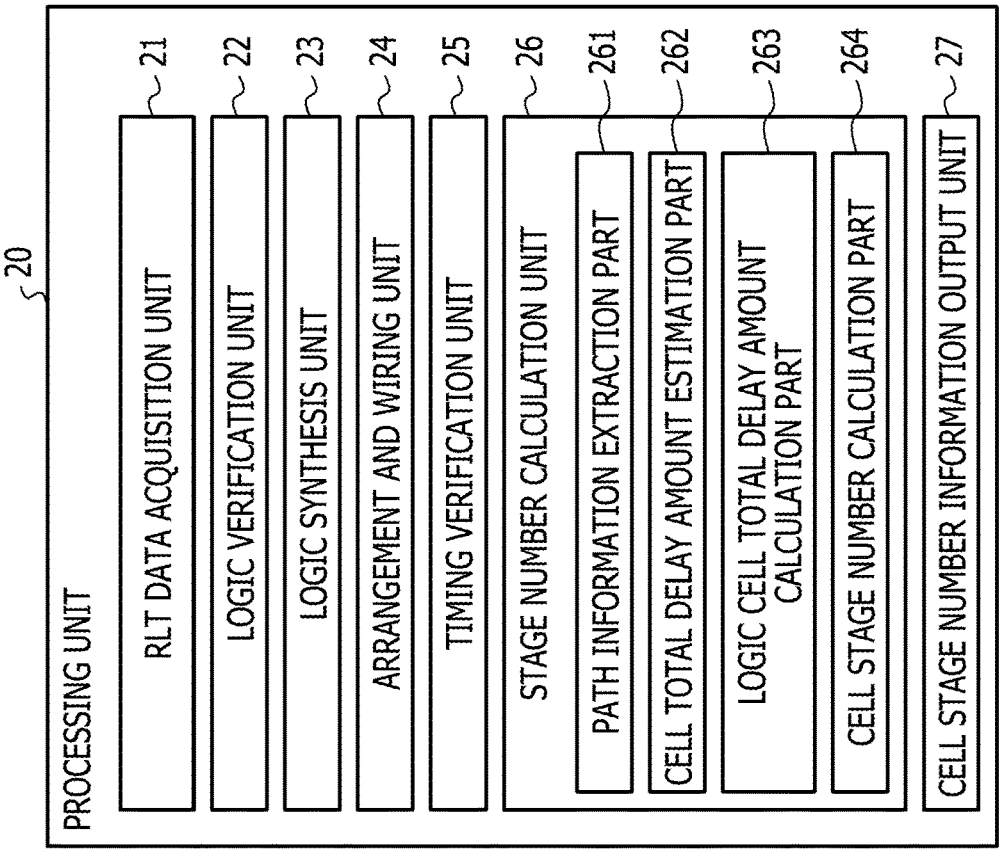
FIG. 4B is a functional block diagram of a processing unit illustrated in FIG. 4A.
Figure 4A:
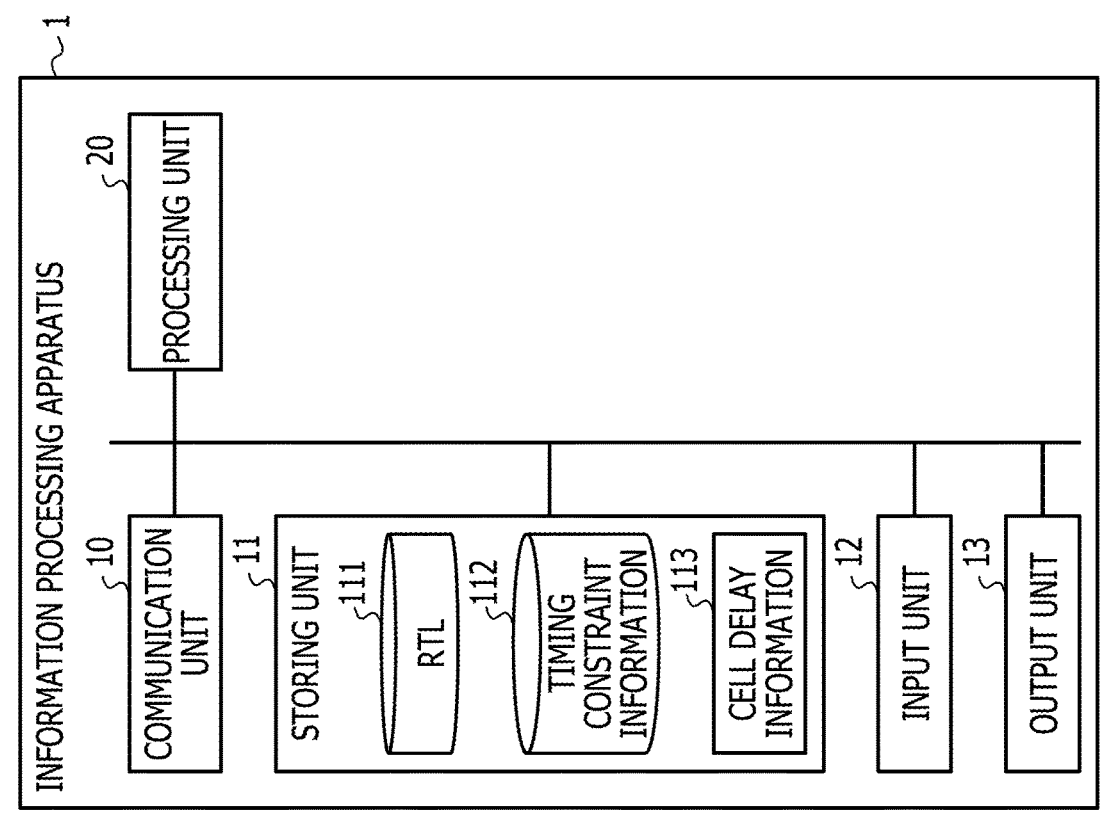
FIG. 4A is a circuit block diagram of an information processing apparatus that executes an installation position determination process according to a first embodiment.

Configuration and Function of Information Processing Apparatus Executing Installation Position Determination Process According to First Embodiment FIG. 4A is a circuit block diagram of the information processing apparatus that executes an installation position determination process according to the first embodiment, and FIG. 4B is a functional block diagram of a processing unit illustrated in FIG. 4A.

An information processing apparatus 1 includes a communication unit 10, a storing unit 11, an input unit 12, an output unit 13, and a processing unit 20.

The communication unit 10 communicates with a server (not illustrated) or the like via the Internet according to a protocol of Hypertext Transfer Protocol (HTTP). Then, the communication unit 10 supplies data received from the server or the like to the processing unit 20. The communication unit 10 transmits data supplied from the processing unit 20 to the server or the like.

The storing unit 11 includes, for example, at least one of a magnetic tape device, a magnetic disk device, and an optical disk device. The storing unit 11 stores an operating system program, a driver program, an application program, data, and the like used for a process in the processing unit 20. For example, the storing unit 11 stores, as an application program, an optimum stage number calculation program for executing an optimum stage number calculation process for calculating the optimum stage number of LUTs to be included in the signal path of the FPGA. The optimum stage number calculation program may be installed in the storing unit 11 from a computer-readable portable recording medium such as a CD-ROM, DVD-ROM or the like using a known setup program or the like.

The storing unit 11 stores various data used in the optimum stage number calculation process. Furthermore, the storing unit 11 may temporarily store temporary data relating to a predetermined process. The storing unit 11 stores an RTL 111 describing a logic of circuits installed on the FPGA, timing constraint information 112 describing the timing constraints of the FPGA such as a clock frequency, and cell delay information 113 indicating a delay amount of each cell of a device type of the FPGA.

FIG. 5 is a diagram illustrating an example of the cell delay information 113.

The cell delay information 113 defines the delay amounts of the flip-flop, the LUT, the RAM, and the DSP for each of devices A and B. In the device A, the delay amount of the flip-flop is 100 ps to 150 ps, the delay amount of the LUT is 80 ps to 150 ps, the delay amount of the RAM is 200 ps to 250 ps, and the delay amount of the DSP is 200 ps to 300 ps. On the other hand, in the device B, the delay amount of the flip-flop is 100 ps to 180 ps, the delay amount of the LUT is 100 ps to 150 ps, the delay amount of the RAM is 220 ps to 290 ps, and the delay amount of the DSP is 220 ps to 350 ps.

In the FPGA, even for the same cell, a plurality of delay amounts may be taken according to an arrangement position and an input and output terminal used. For example, in the flip-flop, a delay amount from clock transition is different between a signal output from a non-inverted output terminal Q and a signal output from an inverted output QB. In the LUT, the delay amount differs according to the input terminal and the output terminal to be used.

The input unit 12 may be any device as long as data may be input, and include, for example, a touch panel, a key button, and the like. An operator may input characters, numbers, symbols, and the like using the input unit 12. When the operator operates the input unit 12, the input unit 12 generates a signal corresponding to the operation. Then, the generated signal is supplied to the processing unit 20 as an instruction of the operator.

The output unit 13 may be any device as long as images, frames, and the like are able to be displayed thereon, and include, for example, a liquid crystal display or an organic electro-luminescence (EL) display or the like. The output unit 13 displays images corresponding to image data supplied from the processing unit 20, frames according to moving image data supplied from the processing unit 20, and the like.

The processing unit 20 includes one or a plurality of processors and peripheral circuits thereof. The processing unit 20 comprehensively controls the overall operation of the information processing apparatus 1, and is, for example, a CPU. The processing unit 20 executes a process based on a program (driver program, operating system program, application program, and the like) stored in the storing unit 11. The processing unit 20 may execute a plurality of programs (application programs and the like) in parallel.

The processing unit 20 includes an RLT data acquisition unit 21, a logic verification unit 22, a logic synthesis unit 23, an arrangement and wiring unit 24, a timing verification unit 25, a stage number calculation unit 26, and a cell stage number information output unit 27. The stage number calculation unit 26 includes a path information extraction part 261, a cell total delay amount estimation part 262, a logic cell total delay amount computation part 263, and a cell stage number computation part 264. Each of these units is a functional module realized by a program executed by a processor included in the processing unit 20. Alternatively, these units may be mounted on the information processing apparatus 1 as firmware.

Figure 6A:
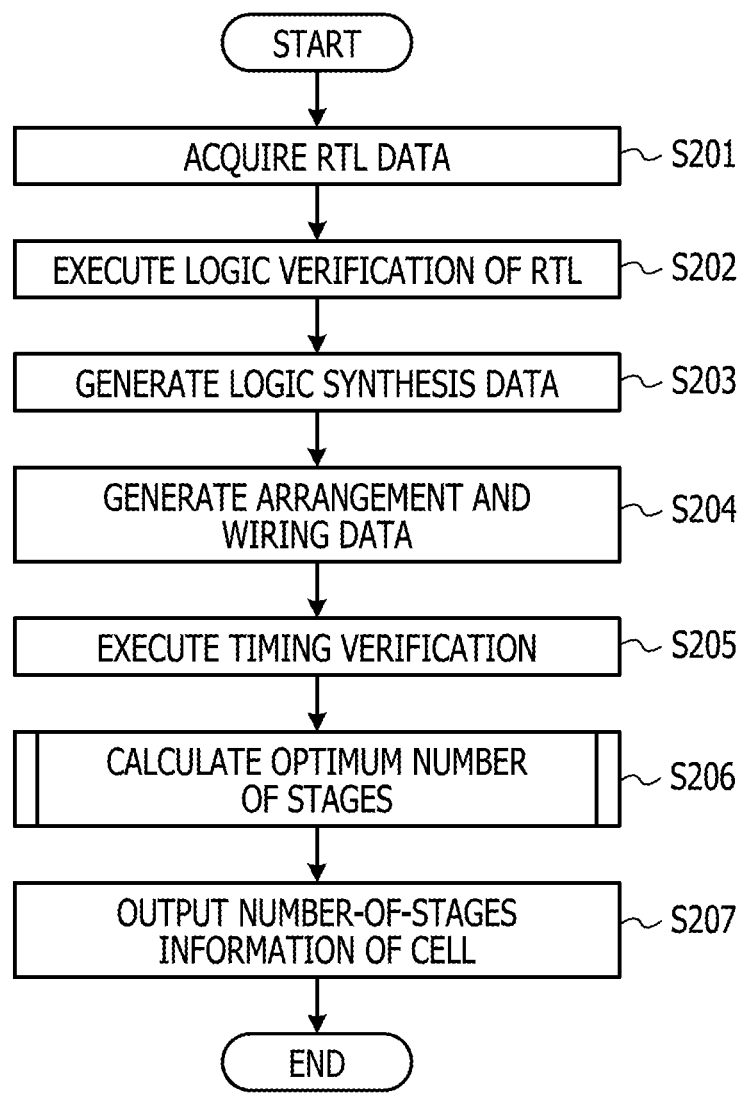
FIG. 6A is a flowchart of an optimum stage number calculation process by the information processing apparatus illustrated in FIG. 4A.
Figure 6B:
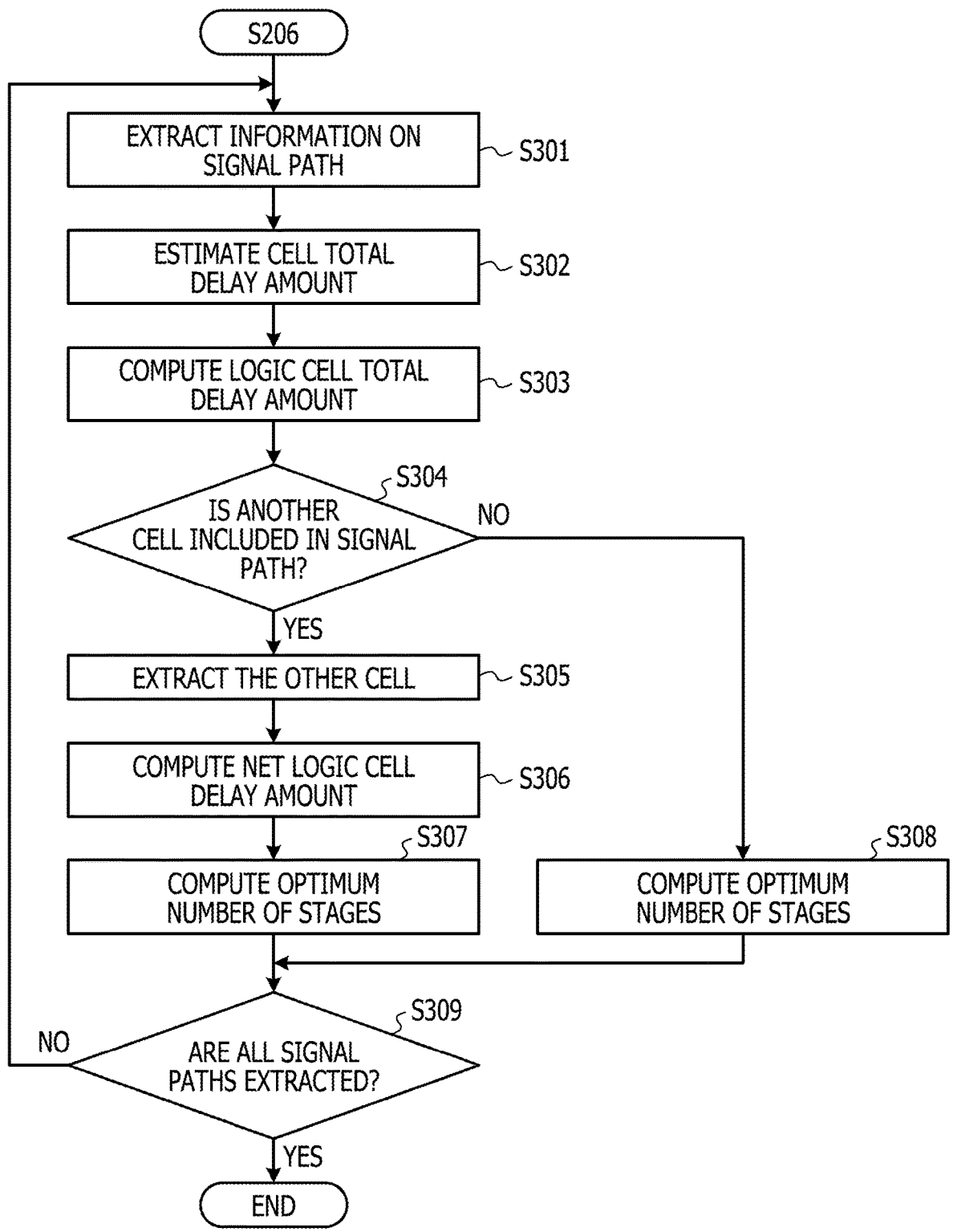
FIG. 6B is a flowchart illustrating a more detailed process for a process of S206 illustrated in FIG. 6A.

Optimum Stage Number Calculation Process by Information Processing Apparatus According to First Embodiment FIG. 6A is a flowchart of an optimum stage number calculation process by the information processing apparatus 1, and FIG. 6B is a flowchart illustrating a more detailed process for the process of S206 illustrated in FIG. 6A. The optimum stage number calculation process illustrated in FIG. 6A is executed mainly by the processing unit 20 in cooperation with each component of the information processing apparatus 1, based on a program stored in advance in the storing unit 11.

First, the RLT data acquisition unit 21 acquires RTL data indicating the RTL designed by the designer (S201). Next, the logic verification unit 22 executes logic verification of the RTL corresponding to the RTL data acquired in the process of S101 according to a designer's instruction via the input unit 12 (S202). Next, the logic synthesis unit 23 executes logic synthesis based on the RTL data, on which the logic verification is performed in the process of S202, and the timing constraint information 112, and generates logic synthesis data (S203). Next, the arrangement and wiring unit 24 executes a process of arranging and wiring a circuit corresponding to the logic synthesis data generated in the process of S203 on the FPGA, and generates arrangement and wiring data indicating arrangement and wiring data information (S204). The arrangement and wiring data information indicates information on the arrangement positions of a plurality of cells and the wiring between the plurality of cells at the time of arranging and wiring of the plurality of cells on the field programmable gate array. Next, the timing verification unit 25 executes timing verification of the arrangement and wiring data information corresponding to the arrangement and wiring data generated in the process of S204 (S205), and stores timing verification information indicating a timing verification result in the storing unit 11. The timing verification information includes information indicating a signal path in which a timing error has occurred. Since the processes of S201 to S205 are well known, detailed description thereof will be omitted here.

Next, the stage number calculation unit 26 references the timing verification information stored in the storing unit 11 and calculates the optimum number of stages of LUTs for resolving the timing error, for each of the signal paths in which the timing error occurs (S206). The stage number calculation unit 26 stores the cell stage number information indicating the calculated number of stages of LUTs in the storing unit 11.

More specifically, the path information extraction part 261 extracts information on the signal path included in the timing verification information stored in the storing unit 11 from the arrangement and wiring data generated in the process of S204 (S301). Next, the cell total delay amount estimation part 262 estimates the cell total delay amount, which indicates the total delay amount of the cells allowed to be included in one period of the clock in the signal path extracted in the process of S301, from input information also called feature amount (S302). The feature amount includes at least clock period information indicating the length of one period of the clock of the signal path.

The cell total delay amount estimation part 262 is a learning machine in which supervised learning is executed, and is realized by, for example, a regression type support vector machine or the like, but may also be realized by another algorithm. A regression type support vector machine is described in "Support Vector Machine" (Takashi Onoda, edited by Artificial Intelligence Society, Aug. 20, 2007) and so forth, and thus detailed description thereof is omitted here.

The cell total delay amount estimation part 262 is subjected to supervised learning based on arrangement and wiring data of the FPGA designed in the past. The feature amount when the cell total delay amount estimation part 262 is subjected to supervised learning includes a length of one period or a frequency of the clock, and arrangement information indicating arrangement position on the FPGA of each of the transmission cell that transmits the signal to the signal path and the reception cell that receives the signal via the signal path. The feature amount when the cell total delay amount estimation part 262 is subjected to supervised learning may include a wiring delay amount obtained by subtracting the total cell delay amount from the total delay amount of the signal path, and other information indicating operation conditions of the FPGA, such as operating frequency and operating temperature of the FPGA. The cell total delay amount estimation part 262 is a regression type supervised learning machine subjected to learning by receiving input information, which includes at least clock period information indicating the length of one clock period, as an input, and outputting the cell total delay amount indicating the total delay amount of the cells included in the signal path as an output.

Figure 7:
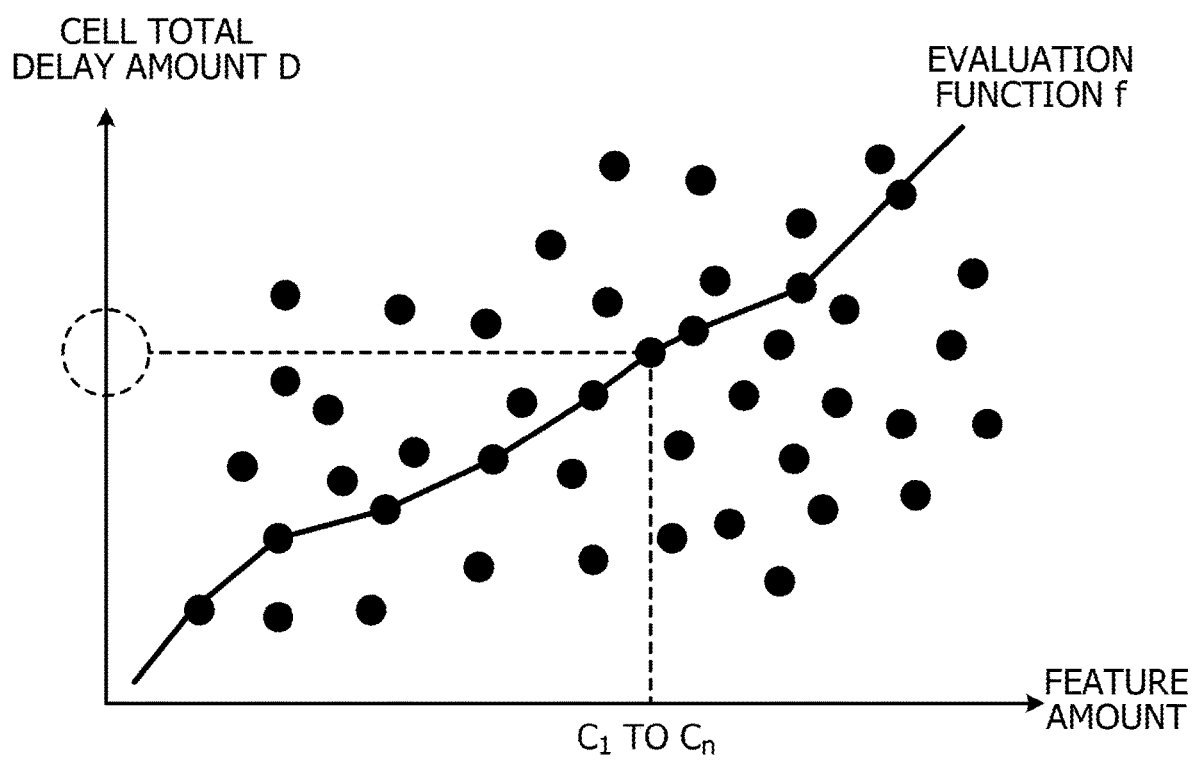
FIG. 7 is a diagram for explaining the operation of a cell total delay amount estimation unit illustrated in FIG. 4B.

A label when the cell total delay amount estimation part 262 is subjected to supervised learning is the cell delay amount of the transmission cell and the cell total delay amount of LUTs included in the signal path. The cell total delay amount estimation part 262 generates a predetermined evaluation function by being subjected to supervised learning using the label and the feature amount extracted from arrangement and wiring data of the FPGA designed in the past. As illustrated in FIG. 7, the cell total delay amount estimation part 262 extracts the feature amount of the signal path from the arrangement and wiring data or the like, and outputs the cell total delay amount corresponding to the extracted feature amount based on the evaluation function. In the example illustrated in FIG. 7, the cell total delay amount estimation part 262 outputs a cell total delay amount D corresponding to n feature amounts $C_1$ to $Cn$ based on an evaluation function f.

Next, the logic cell total delay amount computation part 263 subtracts the delay amount of the transmission cell from the cell total delay amount estimated in the process of S302 and computes the logic cell total delay amount which is the total delay amount the logic cells arranged between the transmission cell and the reception cell (S303). The transmission cell includes, for example, a flip-flop and a RAM. Next, the logic cell total delay amount computation part 263 determines whether another cell other than the transmission cell, the reception cell, and the LUT is included in the signal path or not (S304). The other cell includes, for example, a DSP.

When it is determined that the other cell other than the transmission cell, the reception cell, and the LUT is included in the signal path (YES in S304), the logic cell total delay amount computation part 263 extracts the other cell other than the transmission cell, the reception cell, and the LUT included in the signal path (S305). Next, the logic cell total delay amount computation part 263 subtracts the delay amount of the other cell extracted in the process of S304 from the total logic cell delay amount computed in the process of S303, and calculates a net logic cell delay amount which is the delay amount of only the LUT included in the signal path (S306). The logic cell total delay amount computation part 263 references the cell delay information 113 and acquires the logic cell delay amount. In one example, the cell stage number computation part 264 acquires the maximum value of the delay amount of the DSP stored in the cell delay information 113 as the logic cell delay amount.

The cell stage number computation part 264 computes the optimum number of stages of LUTs arranged in the signal path by dividing the net logic cell delay amount computed in the process of S306 by the logic cell delay amount which is the delay amount of the LUT (S307), and stores the computed number of stages in the storing unit 11. The cell stage number computation part 264 references the cell delay information 113 and acquires the logic cell delay amount. In one example, the cell stage number computation part 264 acquires the maximum value of the delay amount of the LUT stored in the cell delay information 113 as the logic cell delay amount.

When it is determined that the other cell other than the transmission cell, the reception cell, and the LUT is not included in the signal path (NO in S304), the cell stage number computation part 264 computes the number of stages of the LUTs arranged in the signal path by dividing the logic cell total delay amount by the logic cell delay amount (S308). The cell stage number computation part 264 stores the computed stage number in the storing unit 11.

The cell stage number computation part 264 may compute the number of stages capable of being arranged in the signal path by truncating the fractions below the decimal point or by rounding off. The number of stages capable of being arranged in the signal path is computed by the cell stage number computation part 264 truncating the fractions below the decimal point, so that the number of stages computed may have a margin.

Next, the path information extraction part 261 determines whether information is extracted for all signal paths of which information is included in the timing verification information or not (S309). The processes of S301 to S309 are repeated until it is determined, by the path information extraction part 261, that information is extracted for all the signal paths (YES in S309). That is, the process of extracting information on the signal path (S301), estimating the cell delay amount (S302), and calculating the number of stages of logic cells included in the signal path from the cell total delay amount (S303 to S307) is repeated. When it is determined, by the path information extraction part 261, that information is extracted for all the signal paths (YES in S309), the optimum stage number calculation process in S206 is ended.

When the number of stages of the LUT is calculated by the stage number calculation unit 26 (S206), the cell stage number information output unit 27 outputs cell stage number information stored in the storing unit 11 to the output unit 13 (S207). The designer corrects the RTL for the signal path of which information is included in the timing verification information, based on an image corresponding to cell stage number information displayed on the output unit 13.

Action Effect of Information Processing Apparatus According to First Embodiment

The information processing apparatus according to the first embodiment calculates the number of stages of logic cells included in the signal path from the total delay amount estimated from the input information including at least clock period information indicating the length of one period of the clock, and may determine an optimum number of stages without depending on the experience of the designer. In the information processing apparatus according to the first embodiment, since the optimum number of stages of logic cells in the signal path may be determined, correction of the RTL accompanied by the timing error in FPGA circuit design may be desired only once.

The information processing apparatus according to the first embodiment is able to determine the number of stages based on an appropriate cell delay amount excluding the delay amount of the transmission cell by calculating the number of stages of logic cells included in the signal path by using the logic cell total delay amount obtained by subtracting the delay amount of the transmission cell from the cell total delay amount.

The information processing apparatus according to the first embodiment is able to more accurately determine the number of stages of logic cells by calculating the number of stages of logic cells included in the signal path by using the net logic cell total delay amount obtained by further subtracting the delay amount of another cell other than the logic cell.

Also, the information processing apparatus according to the first embodiment is able to more accurately determine the number of stages of logic cells by determining the number of stages of logic cells included in the signal path by using the cell total delay amount estimated based on input information including the arrangement positions of the transmission cell and the reception cell.

Configuration and function of information processing apparatus executing installation location determination process according to second embodiment FIG. 8A is a circuit block diagram of the information processing apparatus that executes an installation position determination process according to a second embodiment, and FIG. 8B is a functional block diagram of a processing unit illustrated in FIG. 8A.

An information processing apparatus 2 differs from the information processing apparatus 1 in that the information processing apparatus 2 includes a processing unit 30 instead of the processing unit 20. The processing unit 30 differs from the processing unit 20 in that the processing unit 30 includes a stage number calculation unit 36 instead of the stage number calculation unit 26. The stage number calculation unit 36 differs from the stage number calculation unit 26 in that the stage number calculation unit 36 includes a path information extraction part 361 and a cell total delay amount estimation part 362 instead of the path information extraction part 261 and the cell total delay amount estimation part 362. Since configurations and functions of the components other than the path information extraction part 361 and the cell total delay amount estimation part 362 of the information processing apparatus 2 are the same as those of the components, which are denoted by the same reference numerals, of the information processing apparatus 1, detailed description thereof will be omitted here.

Figure 9A:
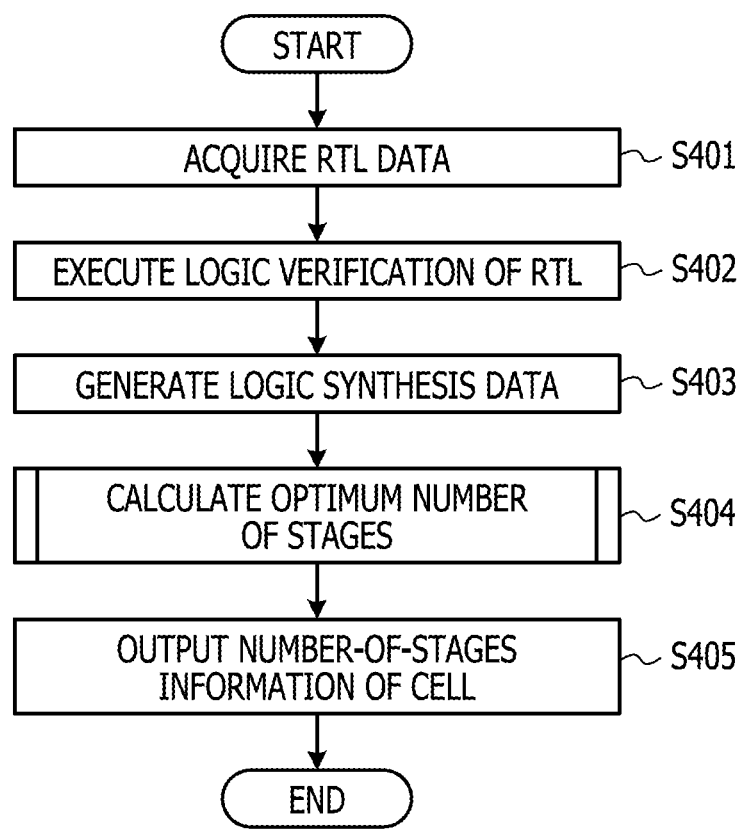
FIG. 9A is a flowchart of the optimum stage number calculation process by the information processing apparatus illustrated in FIG. 8A.
Figure 9B:
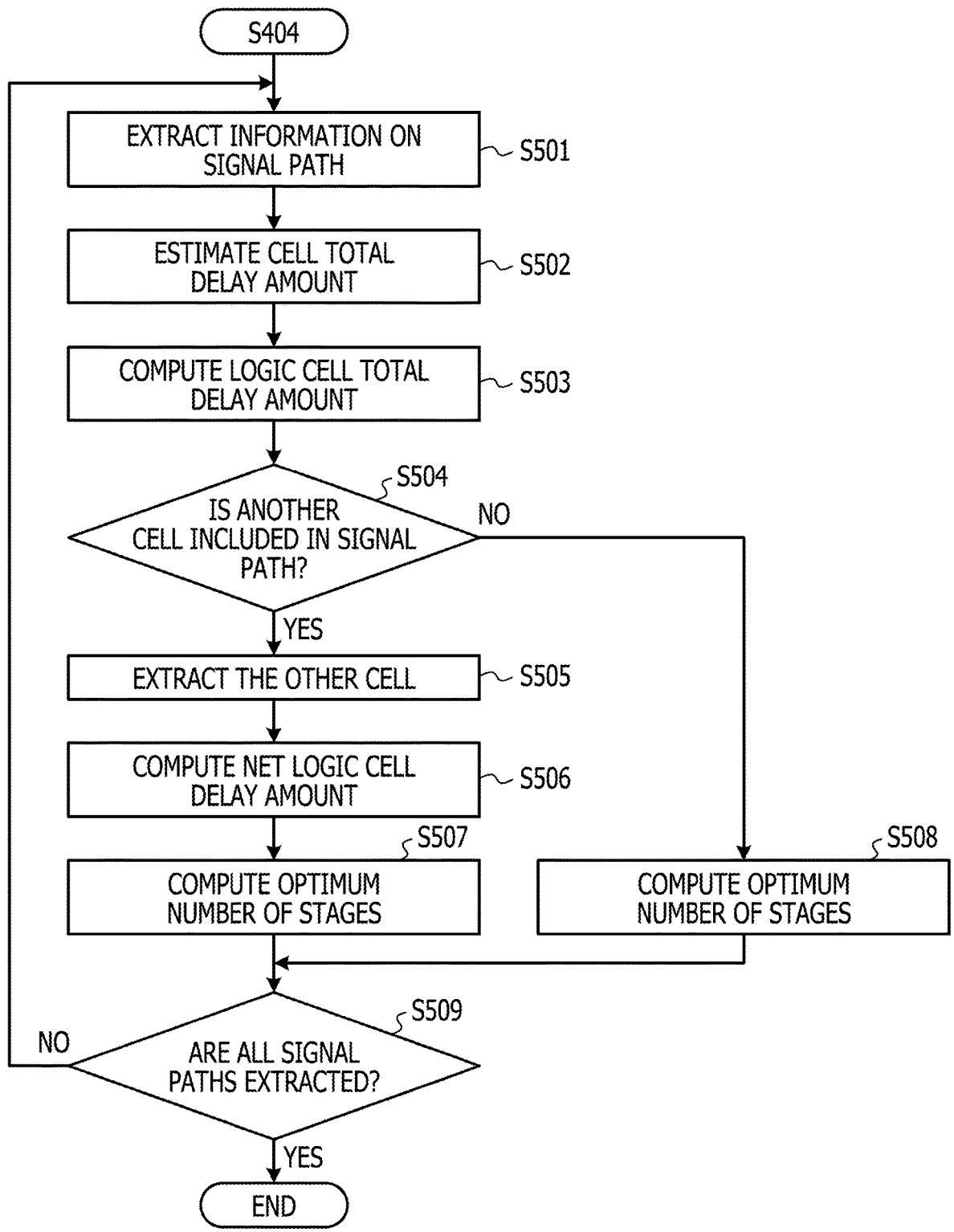
FIG. 9B is a flowchart illustrating a more detailed process for a process of S404 illustrated in FIG. 9A.

Optimum Stage Number Calculation Process by Information Processing Apparatus According to Second Embodiment FIG. 9A is a flowchart of an optimum stage number calculation process by the information processing apparatus 2, and FIG. 9B is a flowchart illustrating a more detailed process for the process of S404 illustrated in FIG. 9A. The optimum stage number calculation process illustrated in FIG. 9A is executed mainly by the processing unit 30 in cooperation with each element of the information processing apparatus 2, based on a program stored in advance in the storing unit 11.

Since the processes of S401 to S403 are similar to the processes of S201 to S203, detailed description thereof will be omitted here. The stage number calculation unit 36 calculates the optimum number of stages of LUTs for each of the signal paths included in the circuit corresponding to logic synthesis data by referencing the logic synthesis data stored in the storing unit 11 (S404).

More specifically, the path information extraction part 361 extracts information on the signal paths included in the circuit corresponding to the logic synthesis data generated in the process of S403 from the logic synthesis data generated in the process of S403 (S501). Next, the cell total delay amount estimation part 362 estimates the cell total delay amount, which indicates the total delay amount of the cells allowed to be included in one period of the clock in the signal path extracted in the process of S501, from the input information also referred to as the feature amount (S502). The feature amount does not include at least clock period information indicating the length of one period of the clock of the signal path, but does not include information included in arrangement and wiring data information such as arrangement positions of the transmission cell and the reception cell. Similar to the cell total delay amount estimation part 262, the cell total delay amount estimation part 362 is a learning machine in which supervised learning is executed, and is, for example, a regression type support vector machine.

Since the processes of S503 to S508 are the same as the process of S303 to S308, detailed description thereof will be omitted here. The path information extraction part 361 determines whether information is extracted for all signal paths included in timing verification information or not (S509). The processes of S501 to S509 are repeated until it is determined that the information is extracted for all the signal paths by the path information extraction part 361 (YES in S509). When it is determined that the information is extracted for all the signal paths by the path information extraction part 361 (YES in S509), the optimum stage number calculation process of S404 is ended.

When the number of stages of LUTs is calculated by the stage number calculation unit 36 (S404), the cell stage number information output unit 27 outputs cell stage number information stored in the storing unit 11 to the output unit 13 (S405). Based on an image corresponding to cell stage number information displayed on the output unit 13, the designer corrects the RTL for the signal path included in the circuit corresponding to the logic synthesis data generated in the process of S403.

When the RTL is corrected by the designer, the processes of S401 to S403 are executed again, and logic synthesis data based on the RTL corrected by the designer is generated. Then, the arrangement and wiring unit 24 executes a process of arranging and wiring the circuit, which corresponds to the logic synthesis data based on the RTL corrected by the designer, on the FPGA, and generates arrangement and wiring data indicating cell arrangement wiring information. Then, the timing verification unit 25 executes timing verification of the arrangement and wiring data information corresponding to the arrangement and wiring data generated in the process of S204, and stores timing verification information indicating the timing verification result in the storing unit 11. The timing verification information includes information indicating a signal path in which a timing error occurs.

Effect of Information Processing Apparatus According to Second Embodiment

Since the information processing apparatus according to the second embodiment calculates the number of stages of logic cells of the signal paths included in the circuit corresponding to the logic synthesis data before arrangement and wiring is executed, arrangement and wiring may be executed using data including a signal path in which logic cells of a more appropriate number of stages are arranged.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optimum stage number calculation method executed by a processor, the optimum stage number calculation method comprising:
    extracting information on a signal path between a transmission cell and a reception cell that transmits and receives a signal according to a clock from net information indicating a connection relationship between a plurality of cells arranged and wired in a field programmable gate array;
    estimating a cell total delay amount indicating a total delay amount of cells allowed to be included in one period of the clock in the signal path from input information including at least clock period information indicating a length of one period of the clock;
    calculating the number of stages of logic cells included in the signal path from the cell total delay amount; and
    outputting number-of-stages information indicating the calculated number of stages of the logic cells,
    the operation of calculating the number of stages of the logic cells includes computing a logic cell total delay amount which is a total delay amount of the logic cells arranged between the transmission cell and the reception cell by subtracting a delay amount of the transmission cell from a total cell delay amount, and computing the number of stages from the logic cell total delay amount and a logic cell delay amount which is a delay amount of a single logic cell.

2. The optimum stage number calculation method according to claim 1, wherein the operation of estimating the cell total delay amount is executed by a supervised learning machine subjected to learning by receiving the input information as an input and outputting the cell total delay amount as an output.

3. The optimum stage number calculation method according to claim 1, wherein the operation of computing the logic cell total delay amount includes extracting another cell other than the transmission cell, the reception cell, and the logic cells included in the signal path, and computing a net logic cell delay amount which is a delay amount of only a logic cell included in the signal path by subtracting a delay amount of the extracted other cell from the logic cell total delay amount, and wherein, in the operation of computing the number of stages, the number of stages is computed by dividing the net logic cell delay amount by the logic cell delay amount.

4. The optimum stage number calculation method according to claim 1, wherein the net information includes arrangement and wiring information indicating information on arrangement positions of the plurality of cells and information on wiring between the plurality of cells when the plurality of cells are subjected to arrangement and wiring on the field programmable gate array, and wherein the input information includes arrangement information indicating arrangement positions of the transmission cell and the reception cell.

5. An information processing apparatus comprising:
    a memory; and
    a processor coupled to the memory and configured to:
        extract information on a signal path between a transmission cell and a reception cell that transmits and receives a signal according to a clock from net information indicating a connection relationship between a plurality of cells arranged and wired in a field programmable gate array, estimate a cell total delay amount indicating a total delay amount of cells allowed to be included in one period of the clock in the signal path from input information including at least clock period information indicating a length of one period of the clock, calculate the number of stages of logic cells included in the signal path from the cell total delay amount, and output number-of-stages information indicating the calculated number of stages of the logic cells, the operation to calculate the number of stages of the logic cells includes computing a logic cell total delay amount which is a total delay amount of the logic cells arranged between the transmission cell and the reception cell by subtracting a delay amount of the transmission cell from a total cell delay amount, and computing the number of stages from the logic cell total delay amount and a logic cell delay amount which is a delay amount of a single logic cell.

6. A non-transitory computer-readable recording medium that stores therein an optimum stage number calculation program that cause a processor to execute a process, the process comprising:

extracting information on a signal path between a transmission cell and a reception cell that transmits and receives a signal according to a clock from net information indicating a connection relationship between a plurality of cells arranged and wired in a field programmable gate array;

estimating a cell total delay amount indicating a total delay amount of cells allowed to be included in one period of the clock in the signal path from input information including at least clock period information indicating a length of one period of the clock;

calculating the number of stages of logic cells included in the signal path from the cell total delay amount; and outputting number-of-stages information indicating the calculated number of stages of the logic cells, the operation of calculating the number of stages of the logic cells includes computing a logic cell total delay amount which is a total delay amount of the logic cells arranged between the transmission cell and the reception cell by subtracting a delay amount of the transmission cell from a total cell delay amount, and computing the number of stages from the logic cell total delay amount and a logic cell delay amount which is a delay amount of a single logic cell.

7. The non-transitory computer-readable recording medium according to claim 6, wherein the operation of estimating the cell total delay amount is executed by a supervised learning machine subjected to learning by receiving the input information as an input and outputting the cell total delay amount as an output.

8. The non-transitory computer-readable recording medium according to claim 6, wherein the operation of computing the logic cell total delay amount includes extracting another cell other than the transmission cell, the reception cell, and the logic cells included in the signal path, and computing a net logic cell delay amount which is a delay amount of only a logic cell included in the signal path by subtracting a delay amount of the extracted other cell from the logic cell total delay amount, and wherein, in the operation of computing the number of stages, the number of stages is computed by dividing the net logic cell delay amount by the logic cell delay amount.

9. The non-transitory computer-readable recording medium according to claim 6, wherein the net information includes arrangement and wiring information indicating information on arrangement positions of the plurality of cells and information on wiring between the plurality of cells when the plurality of cells are subjected to arrangement and wiring on the field programmable gate array, and wherein the input information includes arrangement information indicating arrangement positions of the transmission cell and the reception cell.

* * * * *